(12) United States Patent
Maguire

(10) Patent No.: US 11,432,680 B2
(45) Date of Patent: Sep. 6, 2022

(54) EGG COOKER

(71) Applicant: Michael Joseph Maguire, San Jose, CA (US)

(72) Inventor: Michael Joseph Maguire, San Jose, CA (US)

( * ) Notice: Subject to any disclaimer, the term of this patent is extended or adjusted under 35 U.S.C. 154(b) by 451 days.

(21) Appl. No.: 16/672,437

(22) Filed: Nov. 2, 2019

(65) Prior Publication Data

US 2021/0127900 A1    May 6, 2021

(51) Int. Cl.
*A47J 37/10* (2006.01)
*A47J 36/06* (2006.01)
*A47J 29/02* (2006.01)

(52) U.S. Cl.
CPC ............. *A47J 37/103* (2013.01); *A47J 29/02* (2013.01); *A47J 36/06* (2013.01)

(58) Field of Classification Search
None
See application file for complete search history.

(56) References Cited

U.S. PATENT DOCUMENTS

| | | | | |
|---|---|---|---|---|
| 3,596,590 | A | * | 8/1971 | Harris ...................... A47J 37/10 99/345 |
| 2012/0088021 | A1 | * | 4/2012 | Baumgarten ............. B65B 1/04 426/493 |
| 2014/0079851 | A1 | * | 3/2014 | Osterberg ................ A47J 43/14 426/298 |
| 2016/0374505 | A1 | * | 12/2016 | Reiner ..................... A47J 36/06 |

FOREIGN PATENT DOCUMENTS

| | | | | |
|---|---|---|---|---|
| EP | 1623660 A2 | * | 2/2006 | ............... A47J 43/07 |
| KR | 101621186 B1 | * | 5/2016 | ............... A47J 36/06 |

OTHER PUBLICATIONS

Machine translation of KR 101621186 B1 performed on Mar. 18, 2022, Ha (Year: 2016).*

* cited by examiner

*Primary Examiner* — Brian W Jennison
*Assistant Examiner* — Kevin Guanhua Wen
(74) *Attorney, Agent, or Firm* — Douglas L. Weller

(57) ABSTRACT

An egg cooker includes a base band shaped to be placed on a cooking surface. A cover is connected to the base band. A tunnel within the cover is sized to allow contents of an opened egg to be poured through the tunnel and onto the cooking surface. A length of the tunnel is selected so that when the cover is mounted on the cooking surface, a base at a bottom of the tunnel is elevated over the cooking surface to a height that allows a white of the opened egg to pass under the base of the tunnel to the cooking surface under the cover, while retaining a top of a yolk of the opened egg within an inside circumference of the tunnel.

20 Claims, 6 Drawing Sheets

EGG COOKER

BACKGROUND

To cook sunny side up eggs, a table spoon of butter or other form of grease such as lard, bacon fat or olive oil is added to a heated skillet or other cooking surface. One or more eggs are then broken open and the contents poured into the skillet so that the egg yolks remain intact and the egg whites remain separated. The skillet may be covered and the eggs cooked until the egg whites are firm and cooked on top. This typically takes two to three minutes of cooking, depending on the heat of the skillet. The skillet can be heated over a heating element of a cook top or in an oven.

DETAILED DESCRIPTION

Figure 1A:
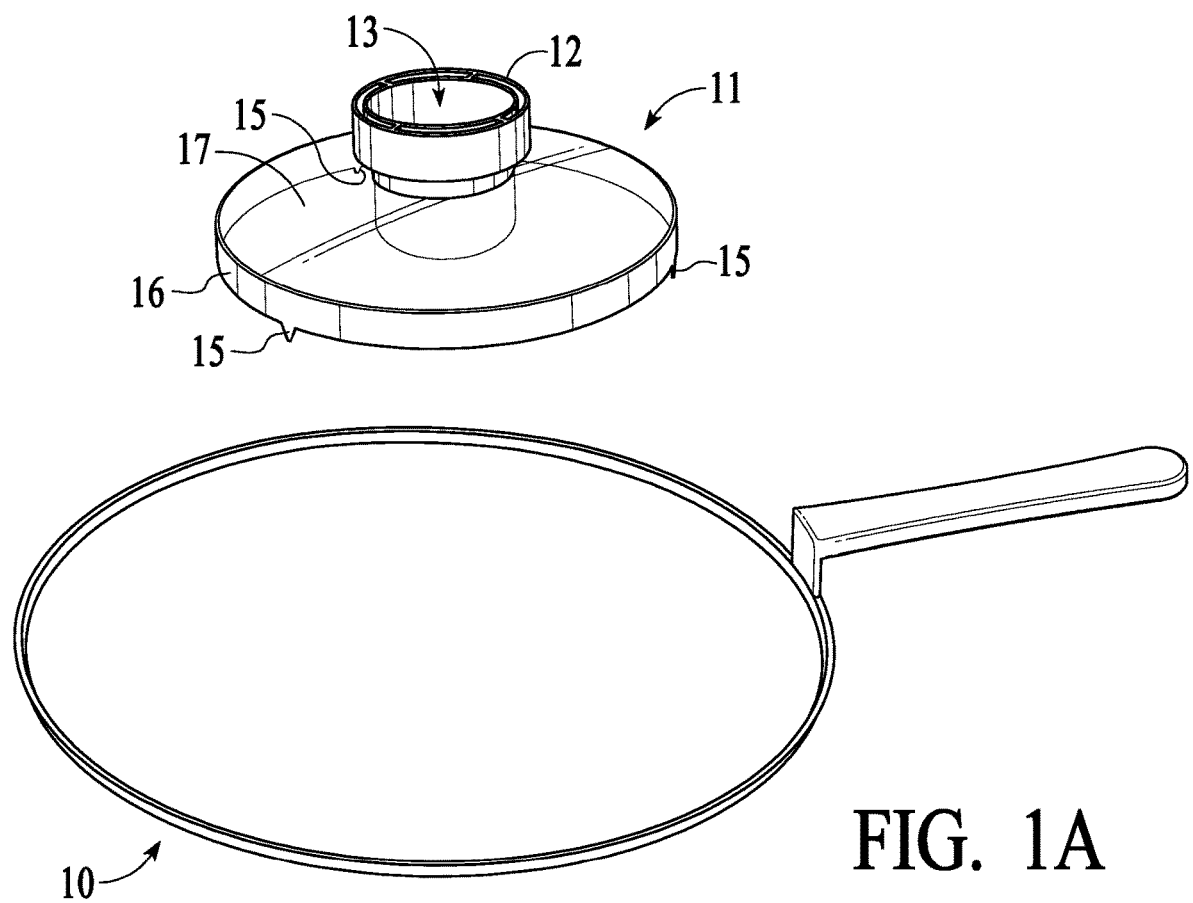
FIG. 1A and FIG. 1B show use of an egg cooker used to cook a sunny side up egg in a skillet or other cooking surface in accordance with an implementation.
Figure 1B:
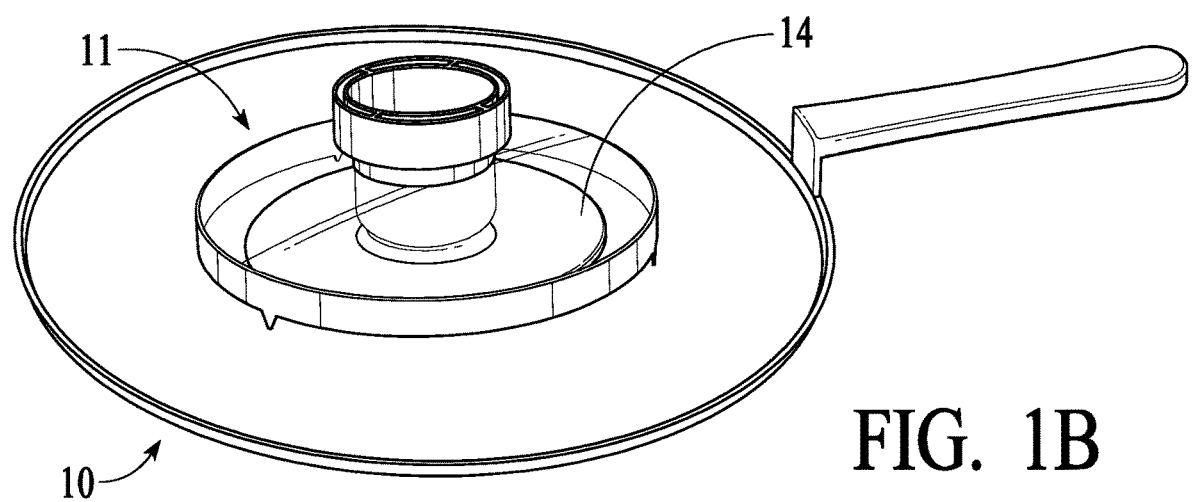

FIG. 1A and FIG. 1B show use of an egg cooker 11 used to cook a sunny side up egg 14 in a skillet 10. Egg cooker 11 includes a base ring 16 on which optionally are located legs 15 that position base ring 16 slightly raised above a bottom of skillet 10. Alternatively, legs 15 can be omitted and base ring 16 can be allowed to rest directly on the bottom of skillet 10, serving as a guide that limits the borders of the whites of the sunny side up egg 14. While FIG. 1A and FIG. 1B show egg cooker 11 placed within skillet, egg cooker 11 can also be placed on and used with other cooking surfaces such as a griddle.

A cover 17 of egg cooker 11 is made of see through material, such as glass or other transparent heat resistant material, that allows observation of egg 14 as egg 14 cooks in skillet 10. Optionally, a non-transparent material can be used to form cover 17.

A tunnel 13 is situated in the middle of cover 17. Tunnel 13 is sized to allow the contents of a cracked open egg to be poured through tunnel 13. The length of tunnel 13 is selected so that when cover 17 is mounted on a cooking surface, the base at the bottom of tunnel is elevated over the cooking surface to a height that allows the white of egg 14 to pass under the base of tunnel 13 to the cooking surface under cover 17 while retaining the top of the yolk within the inside circumference of tunnel 13 and not under cover 17. Using tunnel 13 to form sunny side up egg 14 results in even and rapid cooking of the egg whites due to the heat retained by cover 17 and a pleasing presentation of the cooked egg yolk due to the reduced heat on the top of the yolk retained within the base of tunnel 13 and not under cover 17. For example, tunnel 13 is formed of glass, metal or some other heat resistant material.

A handle 12 on the exterior of tunnel 13 provides for easy placement and removal of egg cooker 11 on skillet 10. For example, handle 12 is heat insulated to hinder heat transmittal from egg cooker 11 to a cook using egg cooker 11. Alternatively, a top of tunnel 13 can have a funnel shape.

Figure 2:
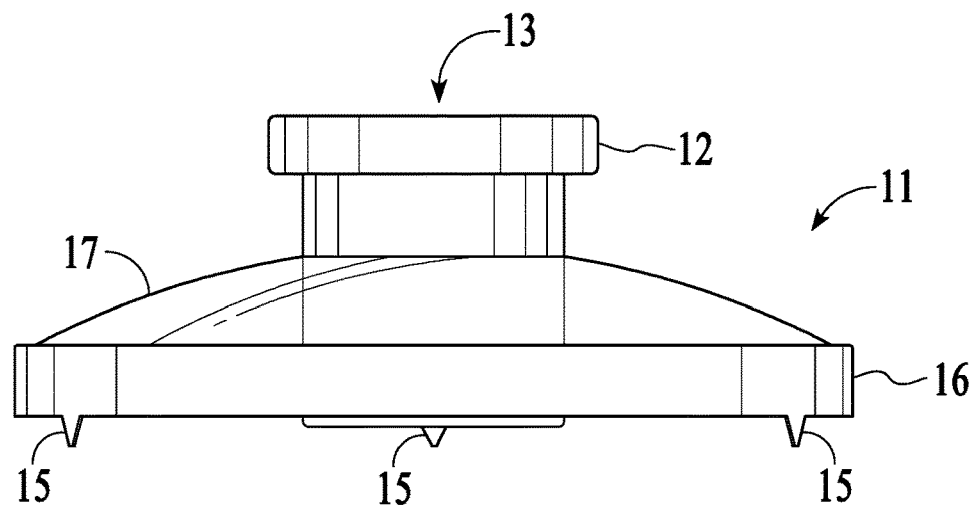
FIG. 2, FIG. 3 and FIG. 4 show different views of the egg cooker shown in FIG. 1A and FIG. 1B.
Figure 3:
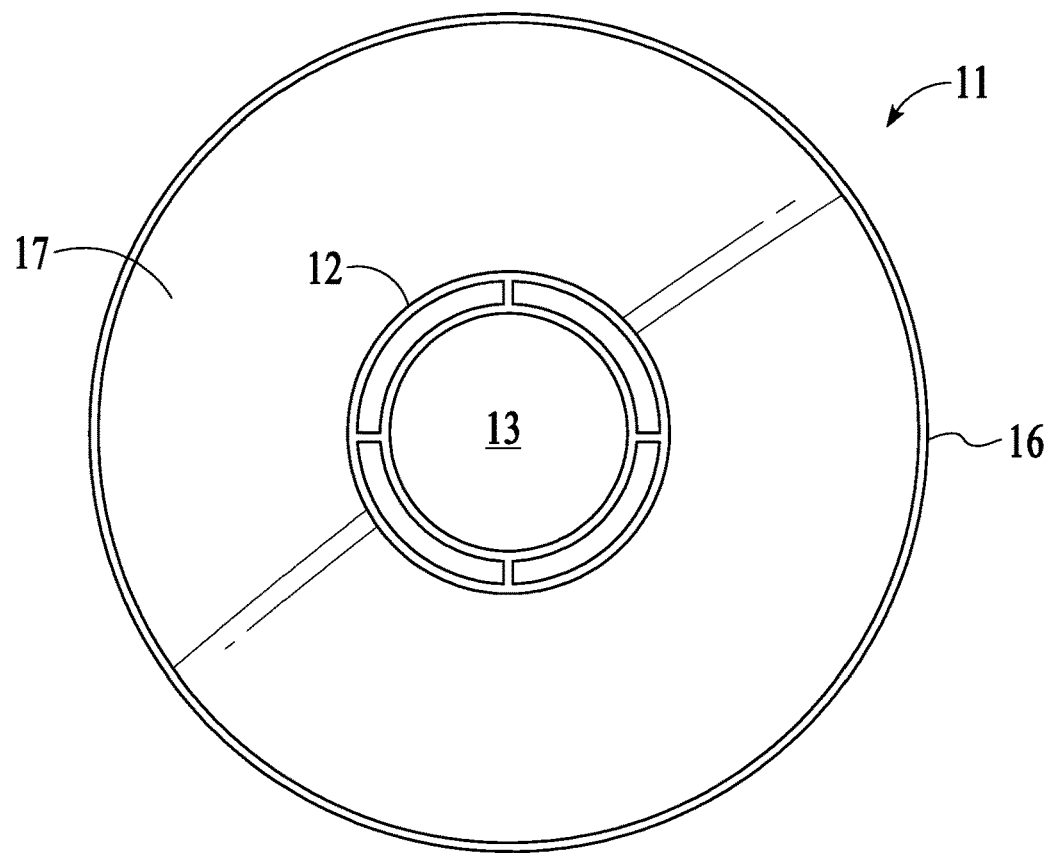
Figure 4:
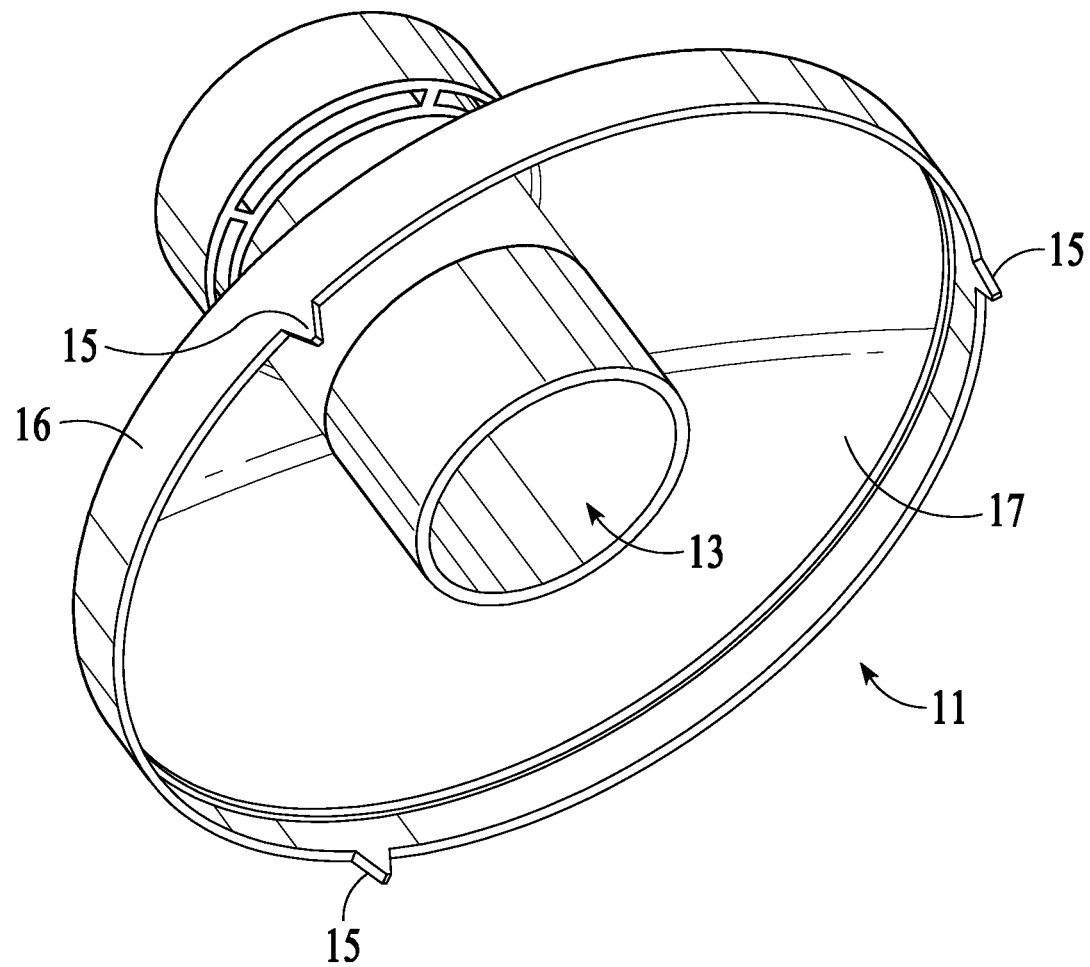

FIG. 2, FIG. 3 and FIG. 4 show different views of egg cooker 11. For example, FIG. 2 is a side elevation view that shows base ring 16, cover 17, legs 15, handle 12 and sidewalls that form tunnel 13. FIG. 3 is a top plan view that shows base ring 16, legs 15, cover 17, handle 12 and a location of tunnel 13. FIG. 4 is a perspective view that shows that shows base ring 16, cover 17, legs 15, handle 12 and sidewalls of tunnel 13.

Figure 5A:
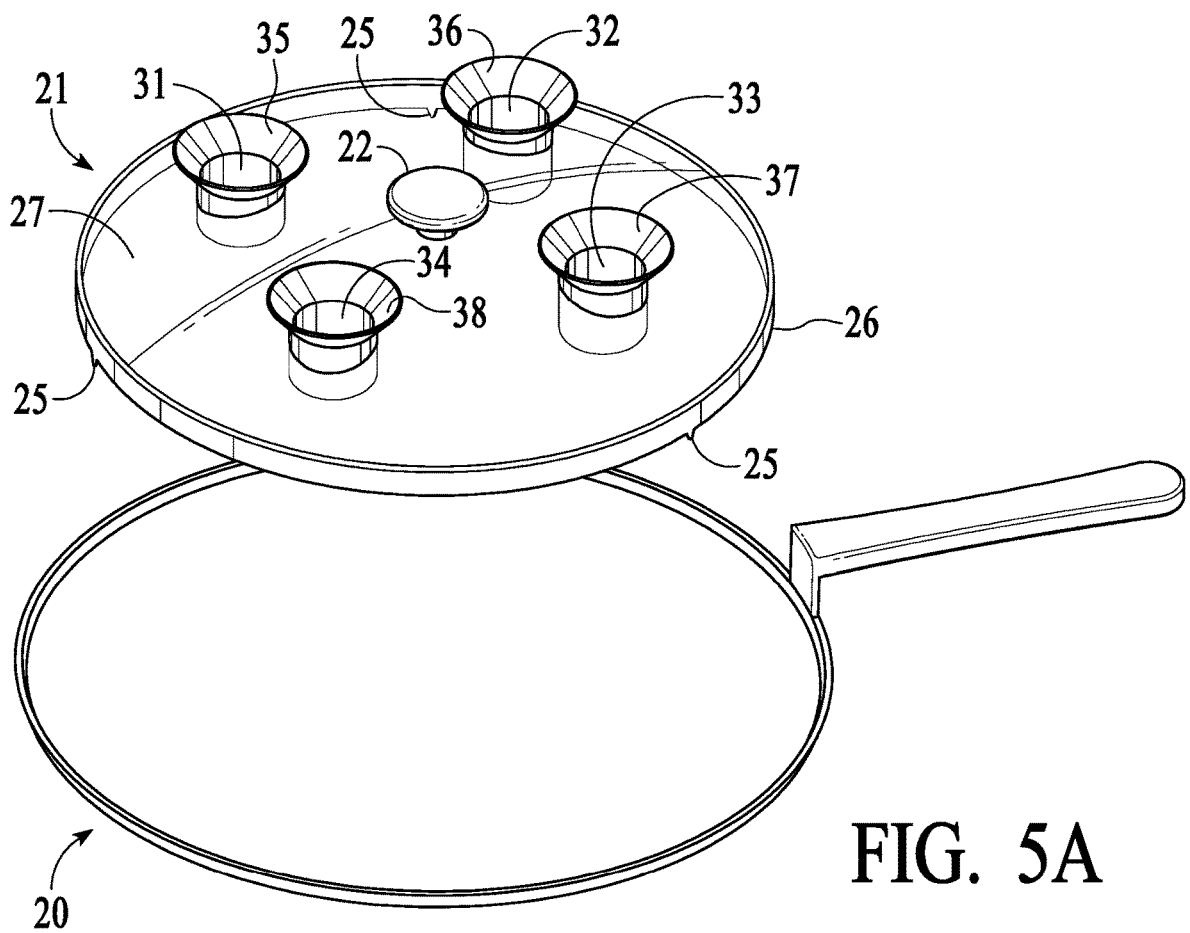
FIG. 5A and FIG. 5B show use of an egg cooker used to cook up to four sunny side up eggs in a skillet or other cooking surface in accordance with an implementation.
Figure 5B:
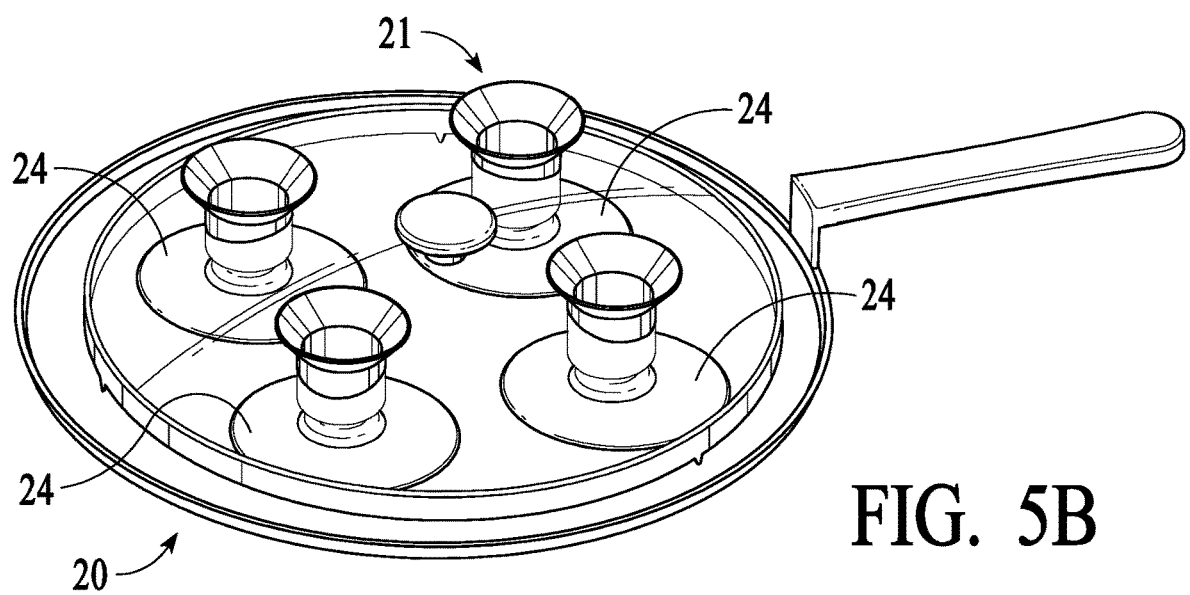

FIG. 5A and FIG. 5B show use of an egg cooker 21 used to cook up to four sunny side up eggs 24 in a skillet 20. Egg cooker 21 includes a base ring 26 on which optionally are located legs 25 that position base ring 26 slightly raised above a bottom of skillet 20. Alternatively, legs 25 can be omitted and base ring 26 can be allowed to rest directly on the bottom of skillet 20. Optionally, four additional rings can be included that serve as a guide that limits the borders of the whites of the sunny side up eggs.

A cover 27 of egg cooker 21 is made of see through material, such as glass or other transparent heat resistant material, that allows observation of sunny side up eggs 24 as sunny side up eggs 24 cook in skillet 20. Optionally a non-transparent material may be used.

A tunnel 31, a tunnel 32, a tunnel 33 and a tunnel 34 are situated around cover 27. Each of tunnel 31, tunnel 32, tunnel 33 and tunnel 34 is sized to allow the contents of a cracked open egg to be poured through the tunnel. The length of each of tunnel 31, tunnel 32, tunnel 33 and tunnel 34 is selected so that when cover 27 is mounted on a cooking surface, the base at the bottom of each tunnel is elevated to a height that allows the white of each egg being cooked to pass under the base of the tunnels to the cooking surface under cover 27 while retaining the top of the yolk within the inside circumference of the tunnels and not under cover 27. Using tunnel 31, tunnel 32, tunnel 33 and tunnel 34 to form sunny side up eggs 24 results in even and rapid cooking of the egg whites due to the heat retained by cover 27 and a pleasing presentation of the cooked egg yolk due to the reduced heat on the top of the yolk retained within the base of the tunnel and not under cover 27. For example, each of tunnel 31, tunnel 32, tunnel 33 and tunnel 34 is formed of glass, metal or some other heat resistant material.

A top of each of tunnel 31, tunnel 32, tunnel 33 and tunnel 34 may have a funnel shape. For example, FIG. 5A and FIG. 5B show a funnel shape 35 located at the top of tunnel 31, a funnel 36 located at the top of tunnel 32, a funnel 37 located at the top of tunnel 33, a funnel 38 located at the top of tunnel 34. The funnels are used as additional guidance for egg contents when poured through the tunnels. A similar funnel shape can also be utilized, for example, for tunnel 13 shown in FIG. 1A and FIG. 1B.

A handle 22 on the exterior of tunnel 23 provides for easy placement and removal of egg cooker 21 on skillet 20. For example, handle 22 is heat insulated to hinder heat transmittal from egg cooker 21 to a cook using egg cooker 21.

Figure 6:
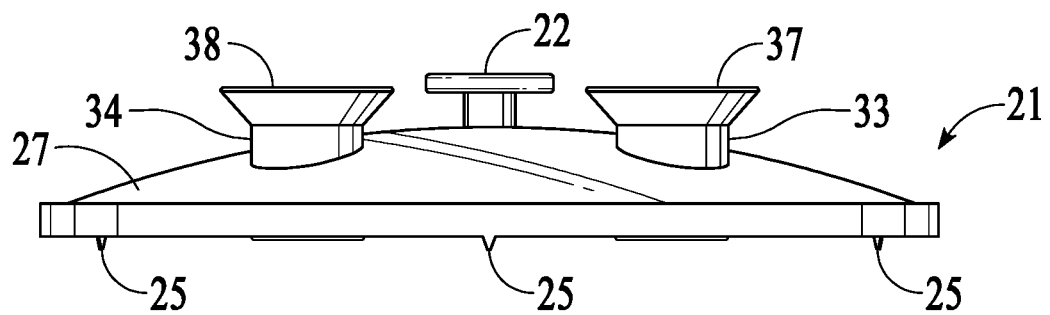
FIG. 6, FIG. 7 and FIG. 8 show different views of the egg cooker shown in FIG. 5A and FIG. 5B.
Figure 7:
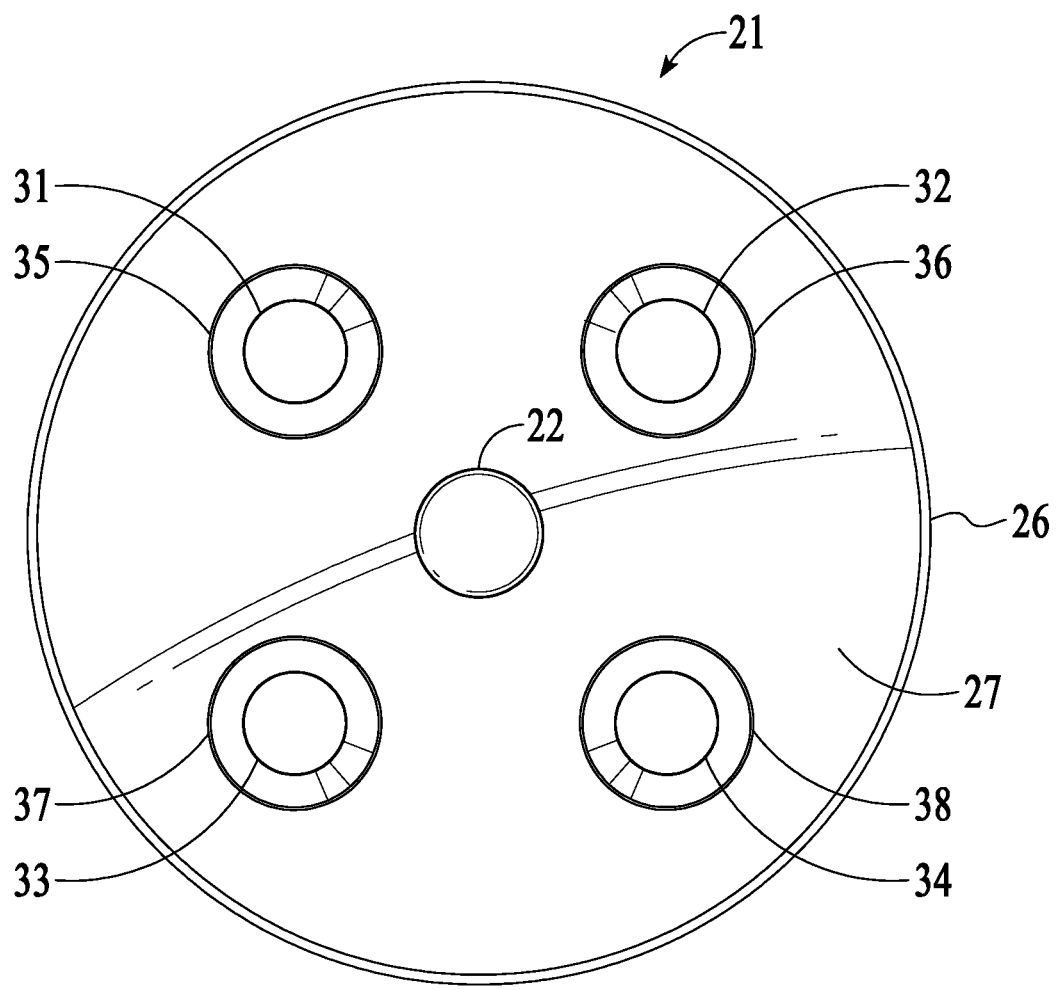
Figure 8:
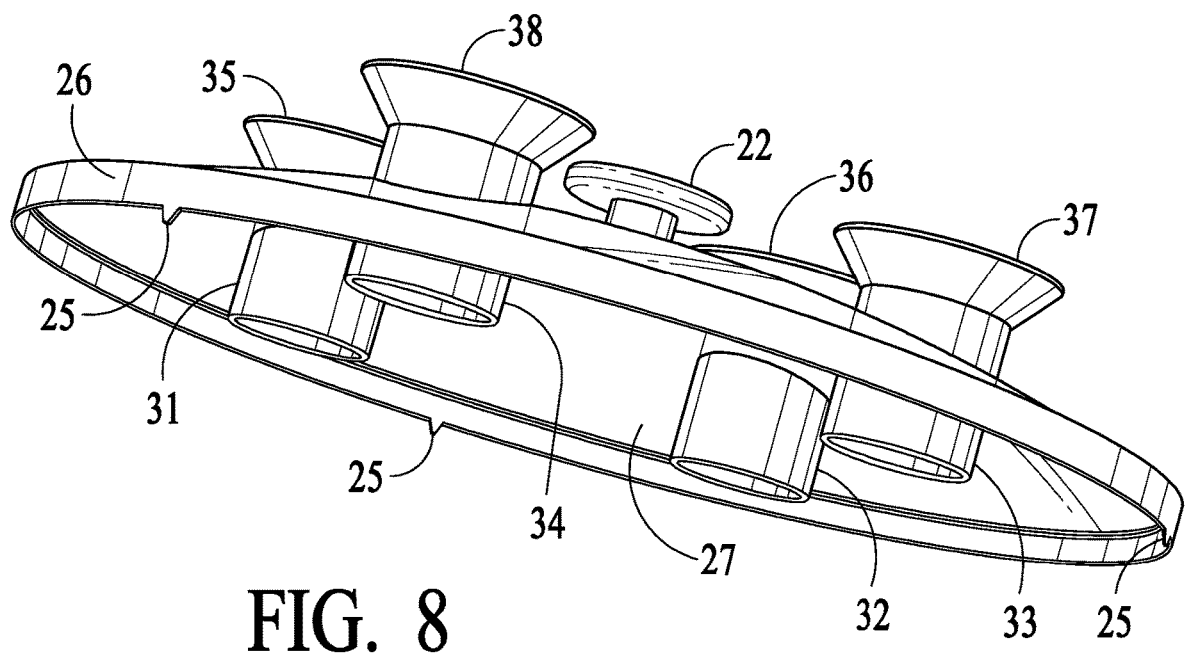

FIG. 6, FIG. 7 and FIG. 8 show different views of egg cooker 21. For example, FIG. 6 is a side elevation view that shows that shows base ring 26, cover 27, legs 25, handle 22 and sidewalls of tunnel 33 and tunnel 34. FIG. 7 is a top plan view that shows base ring 26, legs 25, cover 27, handle 22 and locations of tunnel 31, tunnel 32, tunnel 33 and tunnel 34. FIG. 8 is a perspective view that shows base ring 26, cover 27, legs 25, handle 22 and sidewalls of tunnel 31, tunnel 32, tunnel 33 and tunnel 34.

Figure 9:
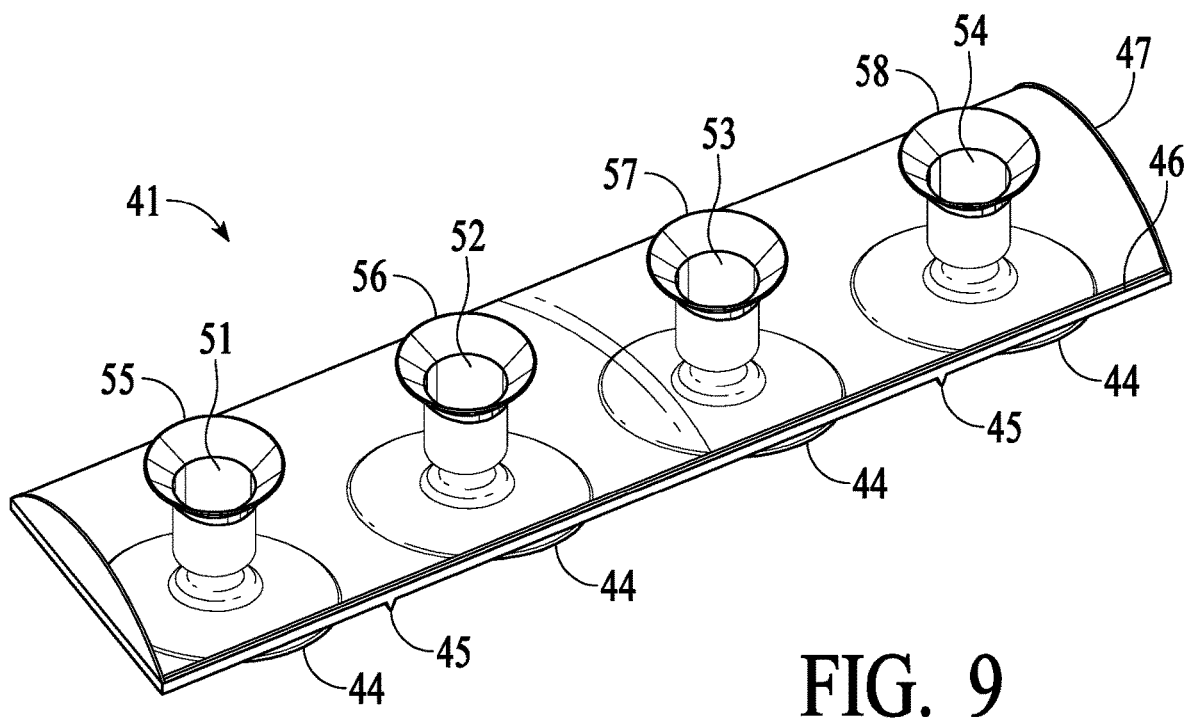
FIG. 9 shows an egg cooker used to cook multiple sunny side up eggs on a cooking surface in accordance with an implementation.

Other configurations for an egg cooker can also be used. For example, FIG. 9 shows a configuration that allows a row of sunny side up eggs to be cooked. For example, this configuration can be used on a cooking surface such as a griddle. While FIG. 9 shows a single row configuration, a multiple row configuration can also be used.

As shown in FIG. 9, egg cooker 41 includes a base band 41 on which optionally are located legs 45 that position base band 41 on the cooking surface.

A cover 47 of egg cooker 41 is made of see through material, such as glass or other transparent heat resistant material, that allows observation of sunny side up eggs 44 as the sunny side up eggs 44 cook on a griddle. Alternatively, cover 47 is not transparent.

A tunnel 51, a tunnel 52, a tunnel 53 and a tunnel 54 are situated around cover 47. Each of tunnel 51, tunnel 52, tunnel 53 and tunnel 54 is sized to allow the contents of a cracked open egg to be poured through the tunnel. The length of each of tunnel 51, tunnel 52, tunnel 53 and tunnel 54 is selected so that when cover 47 is mounted on a cooking surface, the base at the bottom of each tunnel is elevated to a height that allows the white of each egg being cooked to pass under the base of the tunnel to the cooking surface under cover 47 while retaining the top of the yolk within the inside circumference of the tunnel and not under cover 47. Using tunnel 51, tunnel 52, tunnel 53 and tunnel 54 to form sunny side up eggs 44 results in even and rapid cooking of the egg whites due to the heat retained by cover 47 and a pleasing presentation of the cooked egg yolk due to the reduced heat on the top of the yolk retained within the base of the tunnel and not under cover 47. For example, each of tunnel 51, tunnel 52, tunnel 53 and tunnel 54 is formed of glass, metal or some other heat resistant material.

A top of each tunnel of any implementation of the egg cooker may have a funnel shape. For example, FIG. 9 shows a funnel shape 55 located at the top of tunnel 51, a funnel 56 located at the top of tunnel 52, a funnel 57 located at the top of tunnel 53, a funnel 58 located at the top of tunnel 54. The funnels are used as additional guidance for egg contents when poured through the tunnels.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. An egg cooker, comprising:
a base band shaped to be placed on a cooking surface;
a cover connected to the base band;
a tunnel within the cover, the tunnel sized large enough to allow both a white of an opened egg and a yolk of the opened egg to be poured through the tunnel so that the white of the opened egg can come into contact with the cooking surface and both the white of the opened egg and the yolk of the opened egg can be cooked by the cooking surface without being separated; and
a handle connected to the cover;
wherein a length of the tunnel is selected so that when the cover is mounted on the cooking surface, a base at a bottom of the tunnel is elevated over the cooking surface to a height that allows the white of the opened egg to pass under the base of the tunnel to the cooking surface under the cover, while retaining a top of the yolk of the opened egg within an inside circumference of the tunnel.

2. An egg cooker as in claim 1, wherein the handle is integrated into walls of the tunnel.

3. An egg cooker as in claim 1, additionally comprising feet connected to the base band, the feet being placed so that the egg cooker rests on the feet when the egg cooker is placed on the cooking surface.

4. An egg cooker as in claim 1, wherein the tunnel is one of a plurality of tunnels within the cover, each tunnel within the plurality of tunnels being sized to allow contents of opened eggs to be poured through onto the cooking surface.

5. An egg cooker as in claim 4, wherein the plurality of tunnels is four tunnels.

6. An egg cooker as in claim 4, wherein the cover is made of transparent material.

7. An egg cooker as in claim 4, wherein the handle is located in a center of the cover.

8. An egg cooker, comprising:
a base band shaped to be placed on a cooking surface;
a cover connected to the base band; and
a plurality of tunnels within the cover, each tunnel within the plurality of tunnels being sized large enough to allow both a white of an opened egg and a yolk of the opened egg to be poured through the tunnel so that the white of the opened egg can come into contact with the cooking surface and both the white of the opened egg and the yolk of the opened egg can be cooked by the cooking surface without being separated;
wherein a length of each tunnel is selected so that when the cover is mounted on the cooking surface, a base at a bottom of each tunnel is elevated over the cooking surface to a height that allows the white of the opened egg to pass under the base of each tunnel to the cooking surface under the cover, while retaining a top of the yolk of the opened egg within an inside circumference of each tunnel.

9. An egg cooker as in claim 8, additionally comprising: a handle attached to a center of the cover.

10. An egg cooker as in claim 8, additionally comprising feet connected to the base band, the feet being placed so that the egg cooker rests on the feet when the egg cooker is placed on the cooking surface.

11. An egg cooker as in claim 10, wherein the plurality of tunnels is four tunnels.

12. An egg cooker as in claim 8, wherein the plurality of tunnels are organized in a straight line.

13. An egg cooker as in claim 8, wherein the base band has a circular shape.

14. An egg cooker as in claim 8 wherein the cover is transparent.

15. An egg cooker as in claim 8 wherein the cooking surface is a skillet or a griddle.

16. An egg cooker as in claim 8 wherein;
a top of each tunnel in the plurality of tunnels has a funnel shape.

17. An egg cooker, comprising:
a base band shaped to be placed on a cooking surface;
a cover connected to the base band; and
a tunnel within the cover, the tunnel sized large enough to allow both a white of an opened egg and a yolk of the opened egg to be poured through the tunnel so that the white of the opened egg can come into contact with the cooking surface and both the white of the opened egg and the yolk of the opened egg can be cooked by the cooking surface without being separated;

wherein a length of the tunnel is selected so that when the cover is mounted on the cooking surface, a base at a bottom of the tunnel is elevated over the cooking surface to a height that allows the white of the opened egg to pass under the base of the tunnel to the cooking surface under the cover, while retaining a top of the yolk of the opened egg within an inside circumference of the tunnel.

18. An egg cooker as in claim 17, wherein a top of the tunnel has a funnel shape.

19. An egg cooker as in claim 17, additionally comprising feet connected to the base band, the feet being placed so that the egg cooker rests on the feet when the egg cooker is placed on the cooking surface.

20. An egg cooker as in claim 17, wherein the tunnel is one of a plurality of tunnels within the cover, each tunnel within the plurality of tunnels being sized to allow contents of opened eggs to be poured through onto the cooking surface.

\* \* \* \* \*